United States Patent
Girard et al.

(10) Patent No.: US 10,476,239 B2
(45) Date of Patent: Nov. 12, 2019

(54) HIGH ENERGY IGNITION GENERATOR FOR A GAS TURBINE

(71) Applicant: Meggitt (France), Paris (FR)

(72) Inventors: Mickael Girard, Fleac (FR); Gael Gaborel, Paris (FR)

(73) Assignee: Meggitt (France), Paris (FR)

( * ) Notice: Subject to any disclaimer, the term of this patent is extended or adjusted under 35 U.S.C. 154(b) by 112 days.

(21) Appl. No.: 15/010,353

(22) Filed: Jan. 29, 2016

(65) Prior Publication Data

US 2016/0226225 A1    Aug. 4, 2016

(30) Foreign Application Priority Data

Jan. 30, 2015   (FR) ...................... 15 50736

(51) Int. Cl.
*H01T 15/00* (2006.01)
*F02C 7/266* (2006.01)
(Continued)

(52) U.S. Cl.
CPC .............. *H01T 15/00* (2013.01); *F02C 7/266* (2013.01); *F02P 15/003* (2013.01); *F02P 1/086* (2013.01)

(58) Field of Classification Search
CPC ........ F02P 15/003; F02P 7/035; F02P 3/0838; F02P 3/0884; F02P 17/12; F02P 2017/003; F02P 3/0807; F02P 9/002; F02P 9/007; F02P 1/086; F02P 3/08; F02P 15/00; F02C 7/266; F02C 7/26; H03K 3/57; H03K 17/72; H03K 3/53; H03K 3/537; F02B 1/04; H01L 29/0661; H01L 29/0839;

(Continued)

(56) References Cited

U.S. PATENT DOCUMENTS 2,589,164 A * 3/1952 Tognola ................ F02P 15/003
                                                                    315/180
2,623,921 A * 12/1952 Smits ........................ F23Q 3/00
                                                                    102/218

(Continued)

FOREIGN PATENT DOCUMENTS

DE          3729051 A1 *  3/1989  ................ F02P 3/02
WO   WO 2013164816 A1 * 11/2013  ................ F02K 9/95
WO   WO-2013164816 A1 * 11/2013  ................ F02K 9/95

*Primary Examiner* — Thienvu V Tran
*Assistant Examiner* — Nicolas Bellido
(74) *Attorney, Agent, or Firm* — Thompson Coburn LLP; Steven M. Ritchey; Bradley H. Thomas

(57) ABSTRACT

A generator including a source of electric energy connected to means for generating sparks between the electrodes of an ignition spark plug, is characterized in that it comprises a first power portion including first means forming a capacitor for storing energy in series with first means forming a diode, wherein the first means forming a capacitor are also connected to the ignition spark plug through a gas spark gap and at least one second triggering portion including second means forming an energy storage capacitor in series with second means forming a diode, wherein the second means forming a capacitor are connected through at least one controlled semiconductor switching unit, to a primary winding of a voltage step-up transformer for which one secondary winding is connected in series with the gas spark gap between the first means forming a capacitor and the ignition spark plug.

7 Claims, 2 Drawing Sheets

(51) Int. Cl.
*F02P 15/00* (2006.01)
*F02P 1/08* (2006.01)

(58) Field of Classification Search
CPC ..... H01L 29/74; H01L 29/7412; H01L 29/87; H01T 15/00; H02K 3/537; F02K 9/95; F23Q 3/006
See application file for complete search history.

(56) References Cited

U.S. PATENT DOCUMENTS

| | | | | |
|---|---|---|---|---|
| 3,383,553 A * | 5/1968 | Parish | ........................ | F02P 3/10 |
| | | | | 315/183 |
| 3,515,937 A * | 6/1970 | Collins | .................... | F02C 7/266 |
| | | | | 315/200 R |
| 4,727,891 A * | 3/1988 | Schmidt | ................ | F02P 3/0884 |
| | | | | 123/620 |
| 5,030,883 A * | 7/1991 | Bonavia | ................ | F02P 3/0884 |
| | | | | 315/209 T |
| 7,768,767 B2 * | 8/2010 | Dooley | ................. | F02P 3/0807 |
| | | | | 361/253 |
| 9,429,321 B2 * | 8/2016 | Zacarchuk | ................ | F02K 9/95 |
| 2008/0284276 A1 * | 11/2008 | McDonald | ............. | B82Y 30/00 |
| | | | | 310/308 |
| 2013/0025255 A1 * | 1/2013 | Zizzo | ..................... | H01J 17/30 |
| | | | | 60/39.821 |

* cited by examiner

HIGH ENERGY IGNITION GENERATOR FOR A GAS TURBINE

CROSS-REFERENCE TO RELATED APPLICATIONS

The present application is a non-provisional application claiming the benefit of FR 15 50736, filed Jan. 30, 2015, which is incorporated herein by reference in its entirety.

FIELD OF THE INVENTION

The present invention relates to a high energy ignition generator notably for a gas turbine.

More particularly, the invention relates to a generator including a source of electric energy connected to means for generating sparks between the electrodes of an ignition spark plug of the turbine.

BACKGROUND OF INVENTION

Conventionally, such a structure includes an energy storage capacitor in series with a diode and connected to the source of energy.

The capacitor is also connected to the ignition spark plug through a gas-filled spark gap in order to be discharged through the latter and for generating sparks.

Studies have been conducted for very many years in order to replace this gas-filled spark gap with controlled semiconductor switching units, such as for example silicon controlled rectifiers.

In order to have an explanation on the reasons for these studies, reference may for example be made to document FR 2 636 678.

Among other reasons, it will be noted that gas-filled spark gaps pose problems of aging and modification of the ignition voltage.

Further, they use gases containing radioactive elements.

Other problems exist and an exemplary solution to some of them will be found in document FR 2 695 432.

This field of ignition generators for this type of applications is a field which has given rise to many studies and too many patents, from among which mention may be made of documents U.S. Pat. Nos. 3,515,937, 5,032,969, 5,053,913, 5,852,381, 6,104,143, 6,191,536, 7,768,767, US 2013/0025255, US 2014/0176003 and WO 2013/164 816.

But none of the systems described in these documents give entire satisfaction.

In particular it is known that when the gas-filled spark gap is replaced with a controlled semiconductor switching unit, one is confronted with a problem called thermal runaway.

In this respect, it should be noted that the operating conditions of this type of generators are extremely difficult.

Indeed, the latter are placed in proximity to the turbine and are therefore found in an environment with a very high operating temperature, i.e. of more than 120° C.

Now, the semiconductor switching units have a leakage current during the charging of the storage capacitor which increases with their operating temperature.

The increase in the leakage current, consecutive to the increase in the operating temperature of the turbine and therefore of the generator, is expressed by self-heating of the semiconductor switching unit of the latter, which is itself expressed by an increase in the leakage currents, and so forth.

This phenomenon is called thermal runaway and, as a general rule, is expressed by the destruction of the semiconductor switching unit and by a failure of the generator.

DETAILED DESCRIPTION OF INVENTION

The object of the invention is to propose such a generator which may operate at a high energy, a high temperature and which is extremely reliable.

For this purpose, the object of the invention is a high-energy ignition generator notably for a gas turbine, of the type including a source of electric energy connected to means for generating sparks between the electrodes of an ignition spark plug, characterized in that it comprises a first power portion including first means forming an energy storage capacitor in series with first means forming a diode, wherein the first means forming a capacitor are also connected to the ignition spark plug through a gas spark gap and at least one second triggering portion including second means forming an energy storage capacitor in series with second means forming a diode, wherein the second means forming a capacitor are connected through at least the one controlled semiconductor switching unit to a primary winding of a voltage step-up transformer for which one secondary winding is connected in series with the gas spark gap between the first means forming a capacitor and the ignition spark plug.

According to other characteristics of the generator according to the invention, either taken alone or as a combination:
  the semiconductor switching unit includes at least one transistor;
  the semiconductor switching unit includes at least one thyristor;
  the semiconductor switching unit includes at least one SIC element;
  the source of electrical energy is adapted for delivering a power supply voltage of about 3,000 Volts for the first power portion of the generation means and of about 1,000 Volts for the second triggering portion of the latter;
  the source of energy includes two independent power supply sources for charging both means forming a capacitor;
  the spark gap is a gas spark gap without any radioactive element.

The invention will be better understood by means of the description which follows only given as example and made with reference to the appended drawings.

Figure 1:
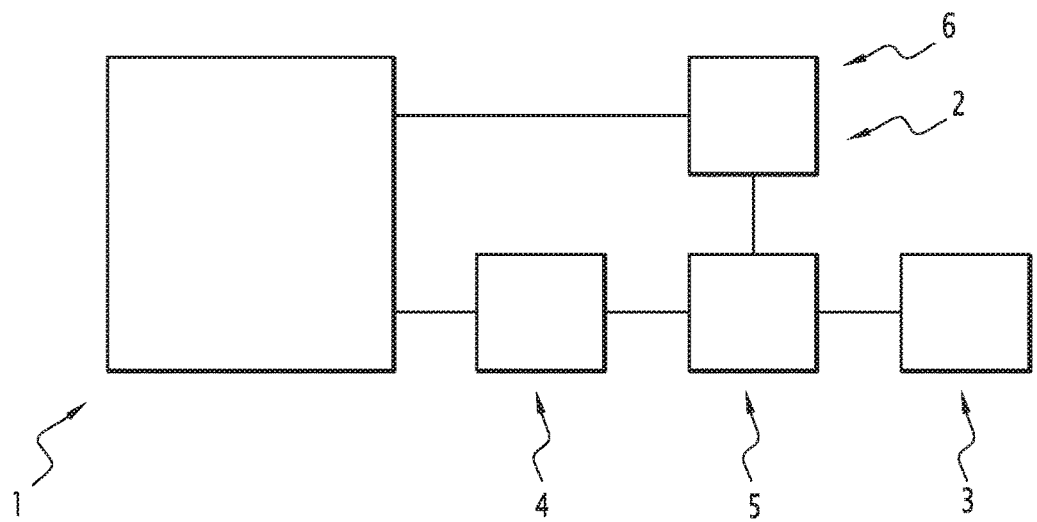
FIG. 1 illustrates a block diagram illustrating the general structure of a generator according to the invention.

Indeed in these figures and in particular in FIG. 1, the general structure of a high-energy ignition generator according to the invention is illustrated, notably for a gas turbine.

This generator conventionally includes means forming a source of electric energy designated by the general reference 1, connected to means for generating sparks designated by the general reference 2, between the electrodes of an ignition spark plug designated by the general reference 3.

As this will be described in more detail in the following, the means for generating sparks in fact include a power circuit designated by the general reference 4, a high temperature hybrid switch designated by the general reference 5, and a circuit for triggering the latter designated by the general reference 6.

Figure 2:
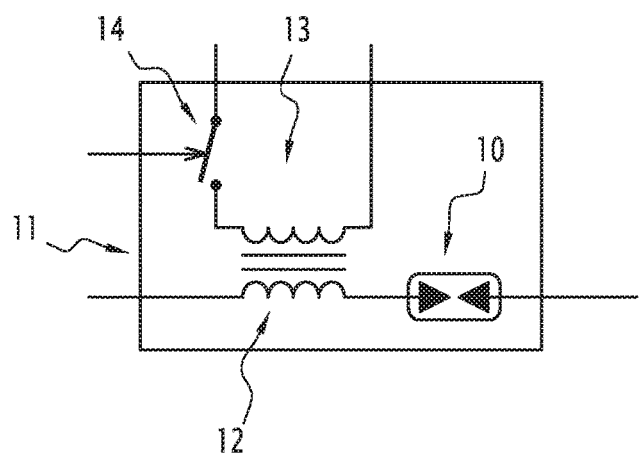
FIG. 2 illustrates a portion of the switching means entering the structure of such a generator.

In fact and as this is illustrated in FIG. 2, in the high temperature hybrid switch used in the generator according to the invention, the latter includes two elements, i.e. a gas spark gap designated by the general reference 10 on the one hand, and a voltage step-up transformer designated by the general reference 11.

The secondary winding designated by the general reference 12 of this transformer 11 is connected in series with the gas spark gap 10 and the primary winding designated by the general reference 13 of this transformer 11, is connected to the source of energy through a controlled semiconductor switching unit, designated by the general reference 14.

The gas spark gap is preferably a gas spark gap without any radioactive element.

The controlled semiconductor switching unit may then for example be a transistor or an SiC thyristor.

Of course, other units may be contemplated.

The electric energy power supply is then adapted for delivering a high power supply voltage, for example of about 3,000 Volts, for the power portion of the circuit and a low power supply voltage, for example of about 1,000 Volts, for the triggering portion of the latter.

Figure 3:
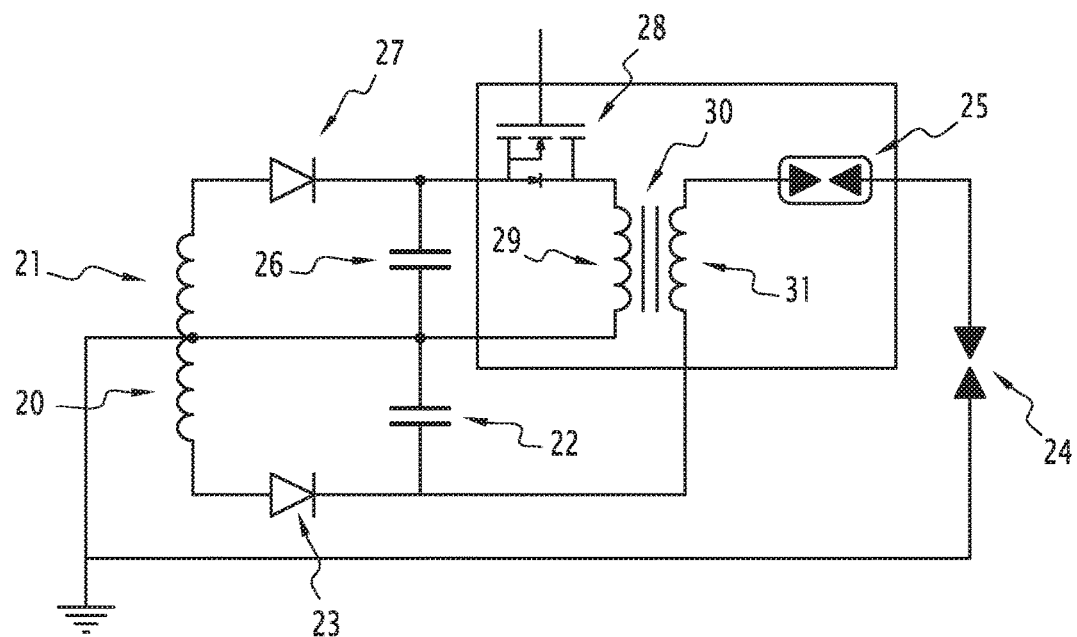
FIG. 3 depicts a diagram illustrating the implantation of the switching means in a generator according to the invention.

This is more clearly visible in FIG. 3, wherein it is seen that the electric energy power supply source for example includes two secondary transformer windings, designated by references 20 and 21 respectively and for example delivering high voltages of 3,000 V and low voltages of 1000 V respectively.

The generator according to the invention then includes, as illustrated in this FIG. 3, a first power portion connected to the secondary 20 comprising the first means forming an electric energy storage capacitor designated by the general reference 22, in series with means forming a diode 23.

These means are therefore powered under the high voltage of the source.

The first means forming a capacitor 22 are also connected to an ignition spark plug designated by the general reference 24, through a gas spark gap designated by the general reference 25 and through the secondary of the voltage step-up transformer designated by reference 31.

The generator according to the invention also includes at least one second triggering portion including second means of forming an energy storage capacitor designated by the general reference 26.

The latter are connected in series with the second means forming a diode 27.

These means are therefore powered under the low voltage of the source.

In this triggering portion, the second means forming a capacitor 26 are also connected through a controlled semiconductor switching unit designated by the general reference 28, to a primary winding 29 of a voltage step-up transformer 30, one secondary winding 31 of which is connected in series with the gas spark gap 25, between the first means forming a capacitor 22 and the ignition spark plug 24.

As this was indicated earlier, the electric energy power supply source may deliver a low voltage for example 1,000 Volts for the triggering portion and a high voltage for example 3,000 Volts for the power portion of the generation means.

The controlled semiconductor switching unit is in the triggering portion of the generator and operates under the low voltage.

This units may for example be formed with at least one transistor or an SIC thyristor.

The spark gap is preferably a gas spark gap without any radioactive element.

It is then conceivable that the driving of the controlled semiconductor switching unit 28 gives the possibility of triggering the discharge of the triggering capacitor 26 into the primary winding 29 of the transformer 30.

This triggering signal is then converted into a low energy pulse and at a high voltage at the secondary 31 of this transformer, which then imposes an overvoltage to the spark gap which allows the latter to be triggered and therefore cause the discharge of the power capacitor 22 into the spark plug 24 and the corresponding generation of a spark.

It is then conceivable that because of the fact that the required voltage for triggering the gas spark gap is greater than the voltage on the terminals of the power capacitor, the system only discharges upon receiving a triggering signal.

In the generator according to the invention, the gas spark gap is not responsible for the triggering of the discharge of the power capacitor so that its triggering voltage threshold does not need to be defined specifically.

Moreover, given that the semiconductor switching unit that does not have to conduct a large amount of current, a switching unit in silicone carbide (SiC) such as a transistor or thyristor for example, may be used for closing the triggering circuit. Thus for example two independent sources are used for charging the capacitors 22 and 26, which gives the possibility of charging the capacitor 26 more rapidly (lower pulsing capacity), and of therefore reducing the leakage current in the switch 28.

It is therefore possible to use a silicon switch 28 and also operate at a high temperature, but without using more expensive SiC components.

Such a structure may then operate at higher temperatures than the generators of the state of the art, have higher current characteristics than known generators and also has an increased lifetime because of the fact that the triggering no longer depends on the aging for example of the gas spark gap.

Of course, it is obvious that other further embodiments may be contemplated.

What is claimed is:

1. A high energy ignition generator for a gas turbine, the high energy ignition generator comprising:
a source of electric energy;
an ignition spark plug that comprises electrodes; and
a sparks generator in electrical connection with the source of electric energy, wherein the sparks generator is capable of generating sparks between the electrodes of the ignition spark plug, wherein the sparks generator comprises:
a power portion including a first capacitor connected in series with a first diode, wherein the first capacitor is also connected to the ignition spark plug through a gas spark gap; and
at least one triggering portion including a second capacitor connected in series with a second diode, wherein the second capacitor is connected through at least one controlled semiconductor switching unit to a primary winding of a voltage step-up transformer, wherein the voltage step-up transformer further comprises a secondary winding connected in series with the ignition spark plug between the first capacitor and the gas spark gap, wherein the gas spark gap is connected on one side directly only to the secondary winding and on the other side directly only to the ignition spark plug, wherein the semiconductor switching unit is capable of triggering a discharge of the second capacitor into the primary winding of the voltage step-up transformer, and wherein the gas spark gap is configured to be triggered when the discharge of the second capacitor is triggered by the semiconductor switching unit.

2. The ignition generator according to claim 1, wherein the semiconductor switching unit includes at least one transistor.

3. The ignition generator according to claim 1, wherein the semiconductor switching unit includes at least one thyristor.

4. The ignition generator according to claim 1, wherein the semiconductor switching unit is based on a silicon carbide (SiC) substrate.

5. The ignition generator according to claim 1, wherein the source of electric energy is adapted for delivering a power supply voltage of 3,000 volts for the power portion of the sparks generator and of 1,000 volts for the triggering portion of the sparks generator.

6. The ignition generator according to claim 5, wherein the source of electric energy includes two independent power supply sources for charging the first and second capacitors.

7. The ignition generator according to claim 1, wherein the gas spark gap is without any radioactive element.

* * * * *